(12) United States Patent
Cui et al.

(10) Patent No.: US 11,313,375 B2
(45) Date of Patent: Apr. 26, 2022

(54) DRIVING ASSEMBLY FOR USE WITH FAN, AND FAN HAVING SAME

(71) Applicants: GD Midea Environment Appliances MFG Co., LTD., Zhongshan (CN); MIDEA GROUP CO., LTD., Foshan (CN)

(72) Inventors: Shiqiang Cui, Zhongshan (CN); Tuanguang Jiang, Zhongshan (CN)

(73) Assignees: GD MIDEA ENVIRONMENT APPLIANCES MFG CO., LTD., Zhongshan (CN); MIDEA GROUP CO., LTD., Foshan (CN)

( * ) Notice: Subject to any disclaimer, the term of this patent is extended or adjusted under 35 U.S.C. 154(b) by 200 days.

(21) Appl. No.: 16/627,087

(22) PCT Filed: Dec. 29, 2017

(86) PCT No.: PCT/CN2017/119861
§ 371 (c)(1),
(2) Date: Dec. 27, 2019

(87) PCT Pub. No.: WO2019/000886
PCT Pub. Date: Jan. 3, 2019

(65) Prior Publication Data
US 2020/0173449 A1 Jun. 4, 2020

(30) Foreign Application Priority Data

Jun. 27, 2017 (CN) .......................... 201710501964.8
Jun. 27, 2017 (CN) .......................... 201720763707.7

(51) Int. Cl.
*F04D 25/10* (2006.01)
*H02K 7/14* (2006.01)
(Continued)

(52) U.S. Cl.
CPC ............. *F04D 25/105* (2013.01); *H02K 5/15* (2013.01); *H02K 7/14* (2013.01); *F04D 29/053* (2013.01)

(58) Field of Classification Search
CPC ....... F04D 25/105; F04D 29/053; H02K 5/15; H02K 7/14
See application file for complete search history.

(56) References Cited

U.S. PATENT DOCUMENTS 5,333,351 A * 8/1994 Sato .................... B60S 1/185
15/250.13
5,720,594 A 2/1998 Snow
(Continued)

FOREIGN PATENT DOCUMENTS

CN 203730360 U 7/2014
CN 104533815 A 4/2015
(Continued)

OTHER PUBLICATIONS

World Intellectual Property Organization (WIPO) Written Opinion for PCT/CN2017/119861 with translation dated Mar. 9, 2018 8 Pages.
(Continued)

*Primary Examiner* — Jianchun Qin
(74) *Attorney, Agent, or Firm* — Anova Law Group PLLC

(57) ABSTRACT

A driving assembly includes a motor bracket, a first driving motor arranged on the motor bracket, a spherical crank, and a second driving motor arranged on the motor bracket and spaced apart from the first driving motor. The spherical crank includes a connecting pillar and a ball head. One end of the connecting pillar is connected with an output shaft of the first driving motor. The ball head is arranged at another end of the connecting pillar. A sphere center of the ball head is not on a rotation axis of the connecting pillar. The second driving motor includes an output shaft arranged at a first end of the second driving motor and configured to be connected
(Continued)

with a fan blade. A second end of the second driving motor is rotatably connected with the ball head.

16 Claims, 7 Drawing Sheets

(51) Int. Cl.
*H02K 5/15* (2006.01)
*F04D 29/053* (2006.01)

(56) References Cited

U.S. PATENT DOCUMENTS

| | | | | |
|---|---|---|---|---|
| 2003/0152420 | A1* | 8/2003 | Broker | F16C 11/0647 403/135 |
| 2011/0052394 | A1* | 3/2011 | Kalhofer | H02K 7/116 416/100 |

FOREIGN PATENT DOCUMENTS

| | | |
|---|---|---|
| CN | 107313958 A | 11/2017 |
| JP | 3145283 U | 10/2008 |
| JP | 2011064199 A | 3/2011 |
| JP | 2015042854 A | 3/2015 |
| JP | 2016011597 A | 1/2016 |

OTHER PUBLICATIONS

World Intellectual Property Organization (WIPO) International Search Report for PCT/CN2017/119861 dated Mar. 9, 2018 5 Pages.
Japan Patent Office Reasons for Refusal For Japanese Application No. 2019569818 dated Dec. 8, 2020 9 Pages (including English translation).

* cited by examiner

DRIVING ASSEMBLY FOR USE WITH FAN, AND FAN HAVING SAME

CROSS-REFERENCE TO RELATED APPLICATIONS

This application is a National Stage Entry under 35 U.S.C. § 371 of International Application No. PCT/CN2017/119861, filed Dec. 29, 2017, which claims priority to Chinese Application Nos. 201720763707.7 and 201710501964.8, both filed Jun. 27, 2017, the entire contents of all of which are incorporated herein by reference.

FIELD

The present disclosure relates to a field of ventilation technologies, in particular to a driving assembly for a fan and a fan having the same.

BACKGROUND

In the related art, the whole heads of most fans oscillate only left and right, without independent rotations of the motor and the fan blade. The current oscillation is realized in a way that a post synchronous motor drives a crank and a connecting rod to move in order to allow the whole head to oscillate left and right. This design has a small air velocity distribution generated by the fan blade, and the air is only blown where the head passes, thus resulting in a small air blowing range.

SUMMARY

The present disclosure seeks to solve at least one of the technical problems existing in the related art. Hence, the present disclosure proposes a driving assembly for a fan, which has the advantages of expanding an air blowing range of the fan and improving an air blowing distance of the fan.

The present disclosure also proposes a fan, which includes the above driving assembly for the fan.

The driving assembly for the fan according to embodiments of the present disclosure includes: a motor bracket; a first driving motor arranged on the motor bracket; a spherical crank including a connecting pillar and a ball head, one end of the connecting pillar being connected with an output shaft of the first driving motor, the ball head being arranged at the other end of the connecting pillar, and a preset distance being defined between a sphere center of the ball head and a rotation axis of the connecting pillar; and a second driving motor arranged on the motor bracket and spaced apart from the first driving motor, the second driving motor having a first end and a second end, the second end being rotatably connected with the ball head, and the output shaft of the second driving motor being arranged at the first end, and connected with a fan blade.

In the driving assembly for the fan according to the embodiments of the present disclosure, the first driving motor and the spherical crank are provided, one end of the spherical crank is connected with the output shaft of the first driving motor, and the ball head is rotatably connected with the second end of the second driving motor, such that when the first driving motor operates, the second driving motor and the fan blade connected with the output shaft of the second driving motor rotate 360 degrees around the rotation axis of the connecting pillar, so as to expand the air blowing range, improve the air blowing velocity and the air blowing distance, and hence meet the user's need for comfort.

According to embodiments of the present disclosure, the driving assembly for the fan further includes a spherical joint bearing arranged on the motor bracket and fitted over the output shaft of the second driving motor.

In some embodiments of the present disclosure, the driving assembly for the fan further includes a first connecting plate connected with the second end, and provided with a ball sleeve fitted with the ball head at a side of the first connecting plate facing away from the second driving motor.

In some embodiments of the present disclosure, the driving assembly for the fan further includes a second connecting plate connected with the first end, and provided with a central pillar on a side of the second connecting plate facing away from the second driving motor. The central pillar is provided with a through hole configured to be passed through by the output shaft of the second driving motor, and the spherical joint bearing is fitted over an outer surface of the central pillar.

In some embodiments of the present disclosure, an outer peripheral wall of the central pillar is provided with a latching slot extending in a peripheral direction thereof, and the driving assembly further includes a circlip configured to be snapped in the latching slot to limit the spherical joint bearing between the second connecting plate and the circlip.

In some embodiments of the present disclosure, a positioning pillar is provided at the second connecting plate, a fixing part is provided at the spherical joint bearing, and connected with an inner ring of the spherical joint bearing, a positioning hole is formed in the fixing part, and the positioning pillar is fitted in the positioning hole.

In some embodiments of the present disclosure, the driving assembly for the fan further includes a rubber sleeve fitted over an outer peripheral wall of the spherical joint bearing.

According to some embodiments of the present disclosure, an included angle between an outermost edge of a theoretical airflow column formed when the fan blade rotates and a rotation central axis of the fan blade is defined as an air diffusion angle R, and the angel R satisfies: 0 degrees$<R\leq45$ degrees.

The fan according to some embodiments of the present disclosure includes: a support assembly; the above driving assembly for the fan, the motor bracket being rotatably arranged on the support assembly; a fan head including a fan blade connected with the output shaft of the second driving motor.

In the fan according to embodiments of the present disclosure, the first driving motor and the spherical crank are provided, one end of the spherical crank is connected with the output shaft of the first driving motor, and the ball head is rotatably connected with the second end of the second driving motor, such that when the first driving motor operates, the second driving motor and the fan blade connected with the output shaft of the second driving motor rotate 360 degrees around the rotation axis of the connecting pillar, so as to expand the air blowing range, improve the air blowing velocity and the air blowing distance, and hence meet the user's need for comfort.

According to some embodiments of the present disclosure, the fan further includes a third driving motor arranged at one of the support assembly and the motor bracket, and an output shaft of the third driving motor is connected with the other one of the support assembly and the motor bracket.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and readily appreciated from the following descriptions made with reference to the drawings, in which.

Figure 1:
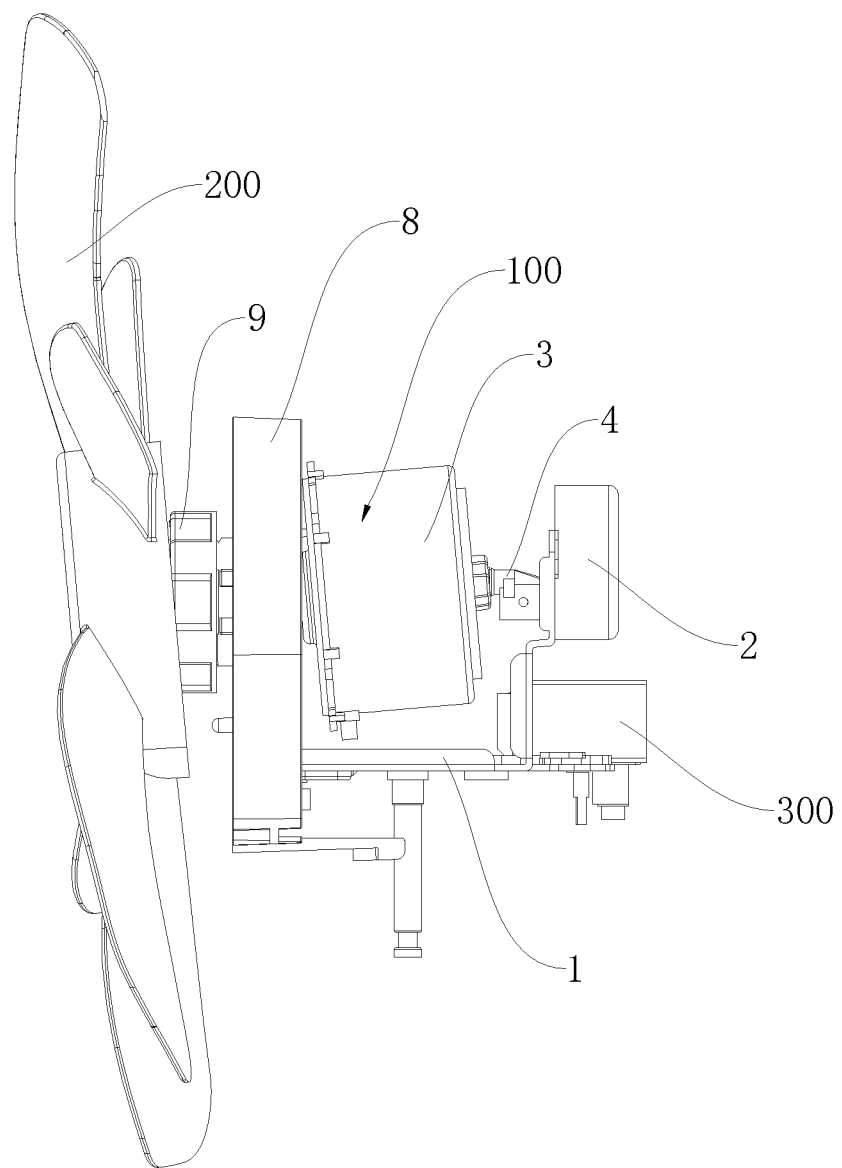
FIG. 1 is a perspective view of a driving assembly for a fan according to an embodiment of the present disclosure.

REFERENCE NUMERALS driving assembly 100,
motor bracket 1, first mounting plate 11, engaging slot 111, second mounting plate 12, via hole 121,
first driving motor 2,
second driving motor 3, first end 31, second end 32,
spherical crank 4, connecting pillar 41, ball head 42,
spherical joint bearing 5, fixing part 51, positioning hole 511,
first connecting plate 6, ball sleeve 61, heat dissipation hole 62,
second connecting plate 7, central pillar 71, through hole 711, positioning pillar 72, latching slot 73, circlip 74, groove 741,
front casing 8, guard lock nut 9,
fan blade 200, third driving motor 300.

DETAILED DESCRIPTION

Embodiments of the present disclosure are further described. Examples of the embodiments are illustrated in the accompanying drawings. Same or similar reference signs represent the same or similar components or components that have the same or similar functions from beginning to end. The embodiments described below with reference to the accompanying drawings are exemplary, are merely used to explain the present disclosure, and cannot be construed as a limitation to the present disclosure.

In the description of the present disclosure, it should be understood that, the orientation or position relationship indicated by the terms "center", "longitudinal", "transverse", "length", "width", "thickness", "up", "down", "front", "rear", "left", "right", "vertical", "horizontal", "top", "bottom", "inside", "outside", "clockwise", "counter clockwise", "axial", "circumferential" thereof are based on the orientation or position relationship illustrated in the drawings. These terms are for convenience and simplification of description and do not indicate or imply that the device or element referred to must have a specific orientation, be constructed and operated in a specific orientation, so these terms shall not be construed to limit the present disclosure. In addition, the feature associated with "first" and "second" may comprise one or more of this feature. In the description of the present disclosure, "a plurality of" means two or more than two, unless specified otherwise.

In the present disclosure, it should be noted, unless specified or limited otherwise, the terms "mounted," "connected," "coupled" or the like are used broadly. The terms may indicate, for example, fixed connections, detachable connections, or integral connections, may also indicate mechanical or electrical connections, may also indicate direct connections or indirect connections via intermediate mediums, and may also indicate inner communications of two elements. The specific meanings of the terms in embodiments of the present disclosure may be understood by those skilled in the art according to particular circumstances.

A driving assembly 100 for a fan according to embodiments of the present disclosure will be described below with reference to FIGS. 1-9.

As illustrated in FIGS. 1-9, the driving assembly 100 for the fan according to embodiments of the present disclosure includes a motor bracket 1, a first driving motor 2, a spherical crank 4 and a second driving motor 3.

Figure 2:
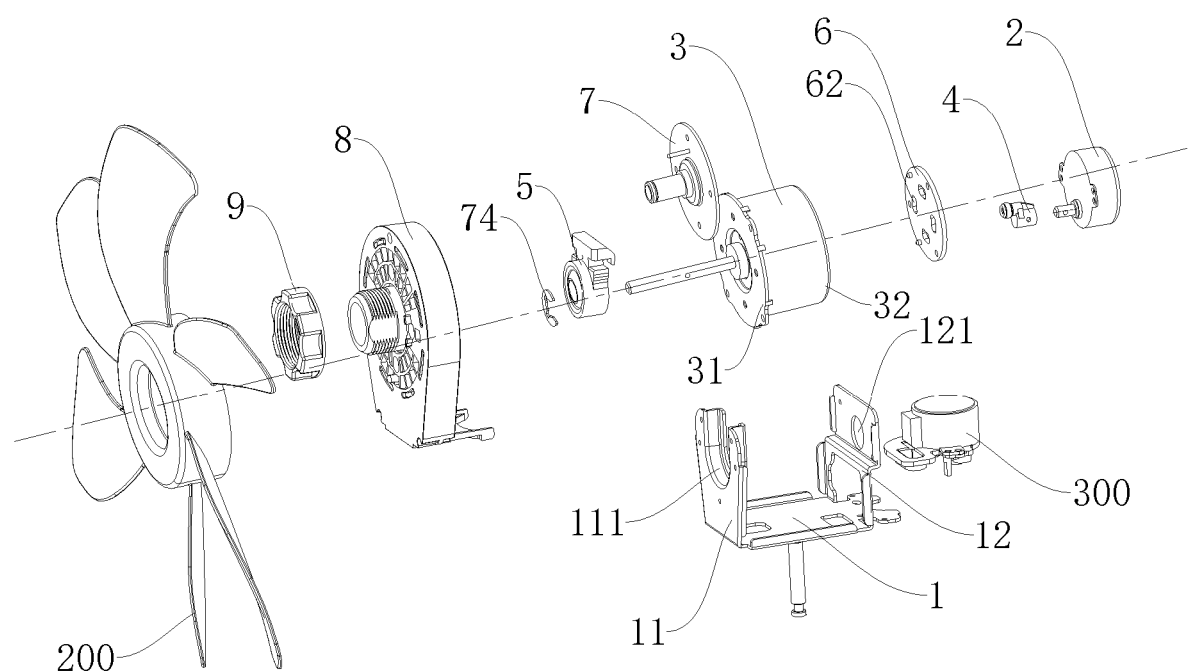
FIG. 2 is an exploded view of a driving assembly for a fan according to an embodiment of the present disclosure.
Figure 3:
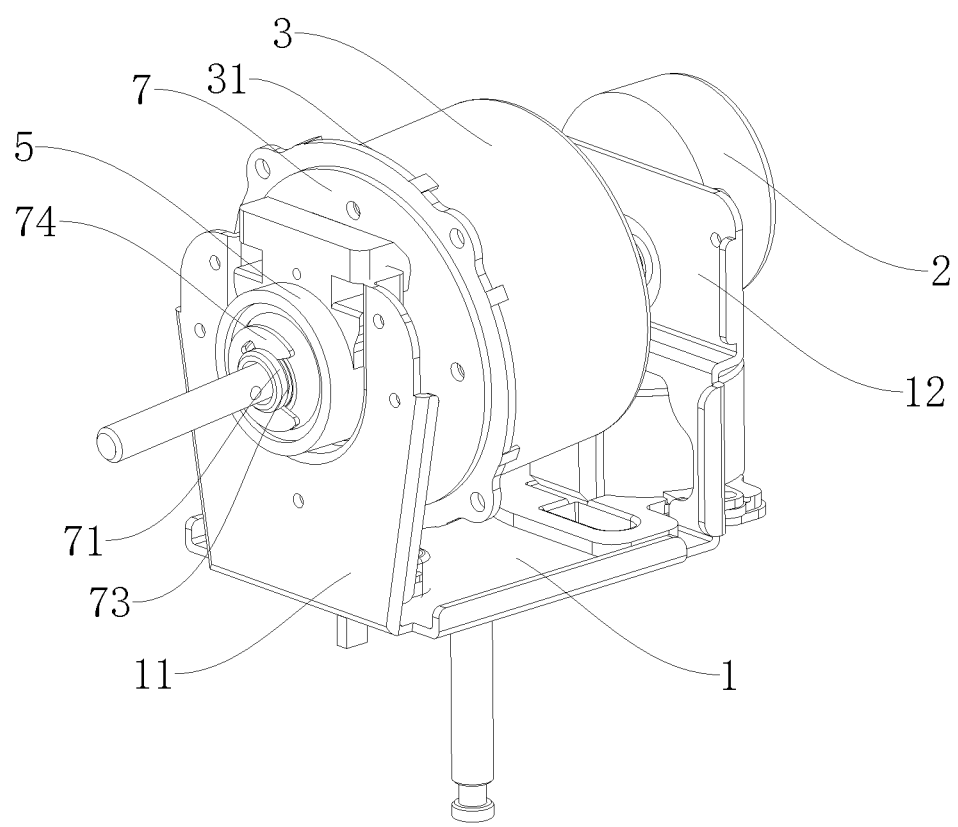
FIG. 3 is a perspective view of a partial structure of a driving assembly for a fan according to an embodiment of the present disclosure.

Specifically, as illustrated in FIG. 1, FIG. 2, FIG. 4 and FIG. 5, the spherical crank 4 includes a connecting pillar 41 and a ball head 42. One end of the connecting pillar 41 is connected with an output shaft of the first driving motor 2, and the ball head 42 is arranged at the other end of the connecting pillar 41. There is a preset distance between a sphere center of the ball head 42 and a rotation axis of the connecting pillar 41, and the preset distance of which is larger than zero. The spherical crank 4 is a crank structure. As illustrated in FIG. 1, FIG. 2 and FIG. 3, the second driving motor 3 is arranged on the motor bracket 1 and spaced apart from the first driving motor 2. The second driving motor 3 has a first end 31 and a second end 32, and the second end 32 is rotatably connected with the ball head 42. An output shaft of the second driving motor 3 is arranged at the first end 31, and connected with a fan blade 200.

The first driving motor 2 operates and the output shaft of the first driving motor 2 rotates to drive the connecting pillar 41 to rotate. The ball head 42 may rotate around the rotation axis of the connecting pillar 41, so as to drive the second end 32 of the second driving motor 3 to rotate 360 degrees around the rotation axis of the connecting pillar 41. The output shaft of the second driving motor 3 rotates 360 degrees around the rotation axis of the connecting pillar 41 under the support of the motor bracket 1, so as to drive the fan blade 200 to rotate 360 degrees around the rotation axis of the connecting pillar 41. Also, the second driving motor 3 may drive the fan blade 200 to rotate around a rotation axis thereof. Thus, the fan blade 200 not only can rotate around its own rotation axis, but also can rotate 360 degrees around the rotation axis of the connecting pillar 41, such that the fan blade 200 can generate an air blowing in a spiral manner, so as to expand an air blowing range, improve an air blowing velocity and an air blowing distance, and hence meet a user's need for comfort.

In the driving assembly 100 for the fan according to the embodiments of the present disclosure, the first driving motor 2 and the spherical crank 4 are provided, the one end of the spherical crank 4 is connected with the output shaft of the first driving motor 2, and the ball head 42 is rotatably connected with the second end 32 of the second driving motor 3, such that when the first driving motor 2 operates, the second driving motor 3 and the fan blade 200 connected with the output shaft of the second driving motor 3 can rotate 360 degrees around the rotation axis of the connecting pillar 41, so as to expand the air blowing range, improve the air blowing velocity and the air blowing distance, and hence meet the user's need for comfort.

Figure 7:
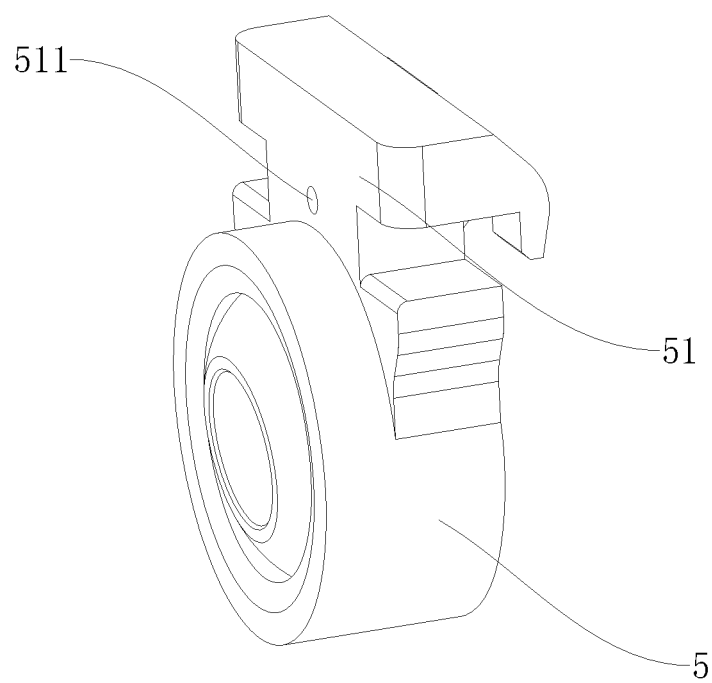
FIG. 7 is a perspective view of a spherical joint bearing of a driving assembly for a fan according to an embodiment of the present disclosure.

In some embodiments of the present disclosure, as illustrated in FIG. 2, FIG. 3 and FIG. 7, the driving assembly 100 also includes a spherical joint bearing 5, and the spherical joint bearing 5 is arranged on the motor bracket 1 and fitted over the output shaft of the second driving motor 3, thus facilitating the output shaft of the second driving motor 3 to rotate 360 degrees with respect to the motor bracket 1 around the rotation axis of the connecting pillar 41, so as to reduce wear of the output shaft of the second driving motor 3 by the motor bracket 1, and thereby improve operation reliability of the second driving motor 3.

Furthermore, as illustrated in FIG. 2 and FIG. 3, the motor bracket 1 is provided with an engaging slot 111, the engaging slot 111 is an arc slot, and the spherical joint bearing 5 is engaged in the engaging slot 111. The engaging slot 111 may fix the spherical joint bearing 5, so as to prevent the spherical joint bearing 5 from falling off from the motor bracket 1 during an operation process of the fan, thus improving the operation reliability of the driving assembly 100 and further enhance the operation reliability of the fan.

Figure 4:
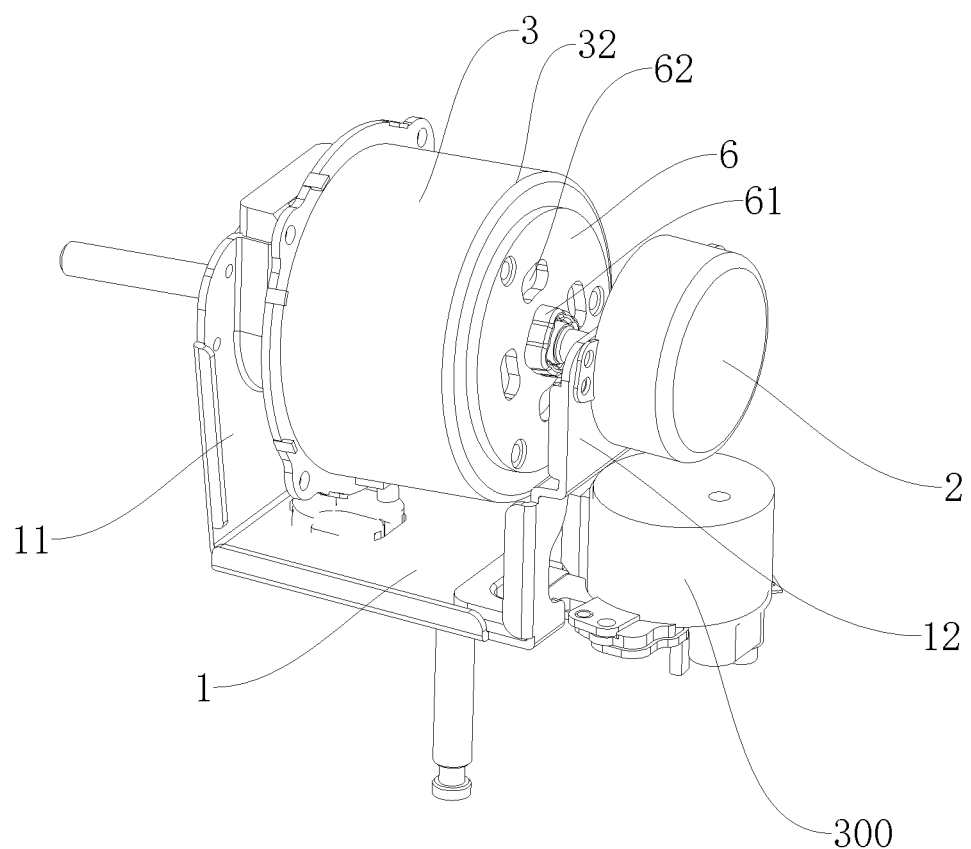
FIG. 4 is a perspective view of a partial structure of a driving assembly for a fan according to an embodiment of the present disclosure.

In some embodiments of the present disclosure, as illustrated in FIG. 2 and FIG. 4, the driving assembly 100 also includes a first connecting plate 6 connected with the second end 32. For example, the first connecting plate 6 may be connected with the second end 32 through a threaded fastener. A side of the first connecting plate 6 facing away from the second driving motor 3, that is, a side of the first connecting plate 6 facing to the spherical crank 4, is provided with a ball sleeve 61 fitted with the ball head 42. The ball head 42 may rotate in the ball sleeve 61, and may rotate 360 degrees, so as to realize the rotatable connection between the spherical crank 4 and the second driving motor 3, thus facilitating the spherical crank 4 to drive the second driving motor 3 to rotate 360 degrees around the rotation axis of the connecting pillar 41. In addition, when the spherical crank 4 and the ball sleeve 61 are assembled, the ball head 42 may be directly pressed into the ball sleeve 61 and engaged within the ball sleeve 61.

Figure 6:
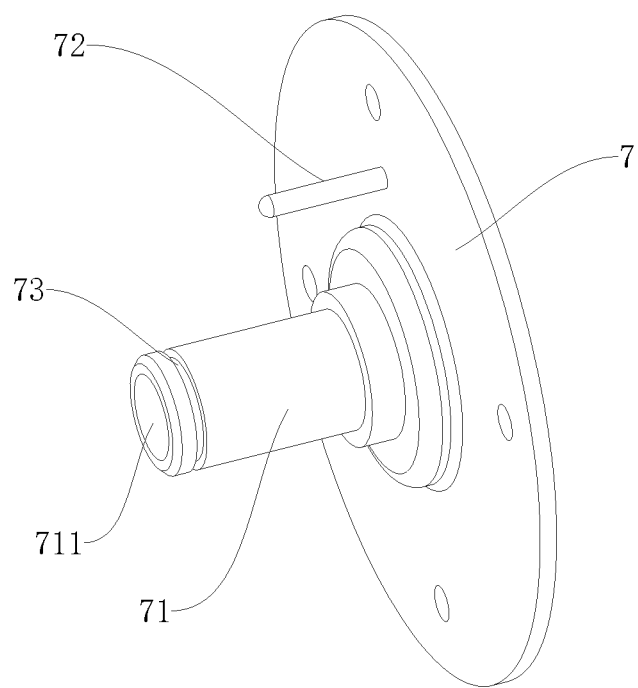
FIG. 6 is a perspective view of a second connecting plate of a driving assembly for a fan according to an embodiment of the present disclosure.

In some embodiments of the present disclosure, as illustrated in FIG. 2, FIG. 3 and FIG. 6, the driving assembly 100 also includes a second connecting plate 7 connected with the first end 31. For example, the second connecting plate 7 may be connected with the first end 31 of the second driving motor 3 through a threaded fastener. A side of the second connecting plate 7 facing away from the second driving motor 3, that is, a side of the second connecting plate 7 facing to the fan blade 200, is provided with a central pillar 71. A cross section of the central pillar 71 has a circular shape. The central pillar 71 is provided with a through hole 711 extending along its length direction, so as to allow the output shaft of the second driving motor 3 to pass therethrough. The spherical joint bearing 5 is fitted over an outer surface of the central pillar 71. Thus, it is convenient for the output shaft of the second driving motor 3 to be fitted with the spherical joint bearing 5, thereby improving the operation reliability of the driving assembly 100.

Figure 8:
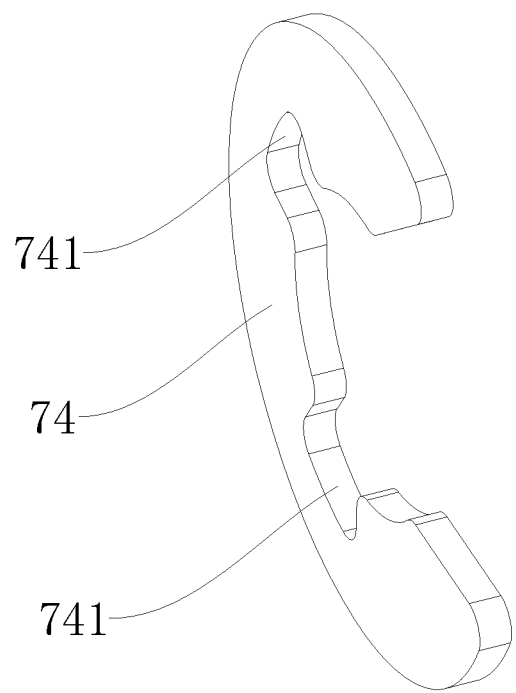
FIG. 8 is a perspective view of a circlip of a driving assembly for a fan according to an embodiment of the present disclosure.

Further, as illustrated in FIG. 6, an outer peripheral wall of the central pillar 71 is provided with a latching slot 73 extending in its circumferential direction. As illustrated in FIG. 2, FIG. 3 and FIG. 8, the driving assembly 100 also includes a circlip 74 snapped in the latching slot 73 to limit the spherical joint bearing 5 between the second connecting plate 7 and the circlip 74. Since the spherical joint bearing 5 is arranged on the motor bracket 1, the spherical joint bearing 5 is limited between the second connecting plate 7 and the circlip 74, so as to ensure a relative position between the second driving motor 3 and the spherical joint bearing 5. Thus, it is convenient for the output shaft of the second driving motor 3 to be fitted with the spherical joint bearing 5, so as to facilitate the second driving motor 3 to drive the fan blade 200 to rotate 360 degrees around the rotation axis of the connecting pillar 41, thereby expanding the air blowing range, improving the air blowing velocity and the air blowing distance, and hence meeting the user's need for comfort.

Furthermore, as illustrated in FIG. 8, the circlip 74 has an arc shape, and the arc-shaped circlip 74 has an opening, so as to be snapped in the latching slot 73 easily. Specifically, a center angle corresponding to the arc is larger than 180 degrees, so as to prevent the circlip 74 from falling off from the latching slot 73. In addition, at least one groove 741 is formed in an inner peripheral wall of the circlip 74, and the circlip 74 tends to be deformed at the groove 741, such that it is convenient for the circlip 74 to be snapped into the latching slot 73 and taken out of the latching slot 73.

In some embodiments of the present disclosure, as illustrated in FIG. 2, FIG. 6 and FIG. 7, a positioning pillar 72 is provided at the second connecting plate 7, and a fixing part 51 is provided at the spherical joint bearing 5. The fixing part 51 is connected with an inner ring of the spherical joint bearing 5, a positioning hole 511 is formed in the fixing part 51, and the positioning pillar 72 is fitted in the positioning hole 511. The positioning pillar 72 may be inserted into the positioning hole 511. When the output shaft of the second driving motor 3 is fitted with the spherical joint bearing 5, that is, when the central pillar 71 of the second connecting plate 7 is fitted with the spherical joint bearing 5, the positioning pillar 72 is inserted into the positioning hole 511, so as to ensure the fitting reliability between the second connecting plate 7 and the spherical joint bearing 5, thereby ensuring the fitting reliability between the output shaft of the second driving motor 3 and the spherical joint bearing 5.

Figure 9:
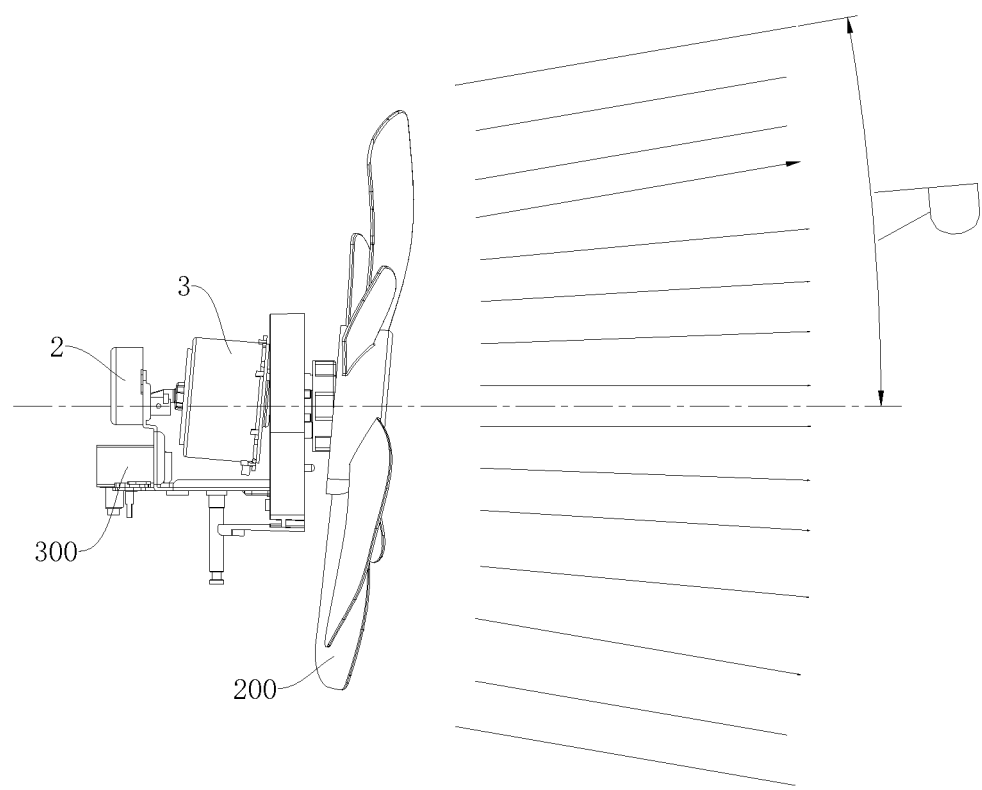
FIG. 9 is a schematic view illustrating an air output of a driving assembly for a fan according to an embodiment of the present disclosure.

In some embodiments of the present disclosure, as illustrated in FIG. 9, an included angle between an outermost edge of a theoretical airflow column formed when the fan blade 200 rotates and a rotation central axis of the fan blade 200 is defined as an air diffusion angle R, which satisfies a following requirement: 0 degrees <R≤45 degrees. Thus, the air blowing range can be expanded and hence the user's need for comfort can be satisfied.

In some embodiments of the present disclosure, the driving assembly 100 also includes a rubber sleeve which is fitted over an outer peripheral wall of the spherical joint bearing 5. Thus, the vibration generated in the operation process of the driving assembly 100 can be reduced and thus the operation reliability of the driving assembly 100 can be improved.

In some embodiments of the present disclosure, as illustrated in FIGS. 1 and 2, the driving assembly 100 also includes a front casing 8 connected with the motor bracket 1, and the output shaft of the second driving motor 3 passes through the front casing 8 to be connected with the fan blade 200. The front casing 8 can increase the aesthetics of the appearance of the driving assembly 100, and also prevent dust from falling on the driving assembly 100.

In some embodiments of the present disclosure, the driving assembly 100 also includes a guard lock nut 9 located on a side of the front casing 8 far away from the motor bracket 1. The guard lock nut 9 is threadedly connected with the front casing 8, and the output shaft of the second driving motor 3 passes through the front casing 8 and the guard lock nut 9 to be connected with the fan blade 200. The guard lock nut 9 is used to limit an air output frame of the fan blade 200 between the front casing 8 and the guard lock nut 9 for the purpose of fixing the air output frame.

A driving assembly 100 for a fan according to a specific embodiment of the present disclosure will be described with reference to FIGS. 1-9 as follows. It should be understood that the following description is only exemplary, which is intended to explain the disclosure, but not to be construed as a limitation of the present disclosure.

As illustrated in FIGS. 1-9, the driving assembly 100 for the fan according to the embodiment of the present disclosure includes a motor bracket 1, a first driving motor 2, a spherical crank 4, a second driving motor 3, a first connecting plate 6, a second connecting plate 7, a spherical joint bearing 5, and a circlip 74.

As illustrated in FIG. 2, the motor bracket 1 includes a first mounting plate 11 and a second mounting plate 12 which are spaced apart from each other. The first driving motor 2 is arranged on the second mounting plate 12 through a threaded fastener and is located on a side of the second mounting plate 12 far away from the first mounting plate 11. The second mounting plate 12 is provided with a via hole 121 having a circular hole. An output shaft of the first driving motor 2 extends through the via hole 121 to be inserted between the first mounting plate 11 and the second mounting plate 12.

Figure 5:
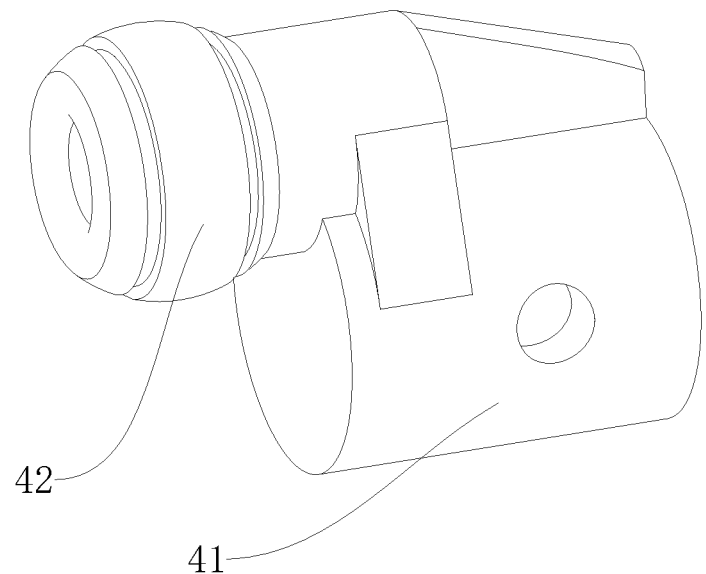
FIG. 5 is a perspective view of a spherical crank of a driving assembly for a fan according to an embodiment of the present disclosure.

As illustrated in FIG. 1, FIG. 2 and FIG. 5, the spherical crank 4 includes a connecting pillar 41 and a ball head 42, and the connecting pillar 41 is a hollow structure. The output shaft of the first driving motor 2 extends into a hollow chamber of the connecting pillar 41, and a fixing pin passes through the connecting pillar 41 and the output shaft of the first driving motor 2 to connect the connecting pillar 41 with the output shaft of the first driving motor 2. The ball head 42 is arranged at an end of the connecting pillar 41 far away from the first driving motor 2, and there is a preset distance between a sphere center of the ball head 42 and a rotation axis of the connecting pillar 41. The preset distance is larger than zero.

As illustrated in FIGS. 1-4, the second driving motor 3 is located between the first mounting plate 11 and the second mounting plate 12, and the second driving motor 3 is spaced apart from the first driving motor 2. The second driving motor 3 has a first end 31 and a second end 32. The output shaft of the second driving motor 3 is arranged at the first end 31, and is configured to be connected with the fan blade 200 to drive the fan blade 200 to rotate. The first connecting plate 6 is a circular plate, and the first connecting plate 6 is connected with the second end 32 through a threaded fastener. The first connecting plate 6 is provided with a plurality of heat dissipation holes 62 spaced apart from each other, so as to dissipate heat for the second driving motor 3. As illustrated in FIG. 4, a side of the first connecting plate 6 facing away from the second driving motor 3 is provided with a ball sleeve 61 fitted with the ball head 42, and the ball head 42 may rotate 360 degrees in the ball sleeve 61.

As illustrated in FIG. 2, FIG. 3 and FIG. 6, the second connecting plate 7 is a circular plate, and the second connecting plate 7 is connected with the first end 31 through a threaded fastener. The second connecting plate 7 is provided with a central pillar 71 extending along its axis direction at a center position of a side of the second connecting plate 7 facing away from the second driving motor 3. A cross section of the central pillar 71 has a circular shape, and the central pillar 71 is provided with a through hole 711 extending along its extension direction. The through hole 711 runs through the central pillar 71 and the second connecting plate 7, and the output shaft of the second driving motor 3 passes through the through hole 711.

As illustrated in FIG. 6, an outer peripheral wall of the central pillar 71 is provided with a latching slot 73 extending in its circumferential direction, and the spherical joint bearing 5 is fitted over an outer surface of the central pillar 71. A circlip 74 is snapped in the latching slot 73 to limit the spherical joint bearing 5 between the second connecting plate 7 and the circlip 74, so as to ensure the fitting reliability of the central pillar 71 and the spherical joint bearing 5, thereby facilitating the output shaft of the second driving motor 3 to rotate. Furthermore, as illustrated in FIG. 2, FIG. 6 and FIG. 7, a positioning pillar 72 is arranged on the second connecting plate 7, and a fixing part 51 is arranged on the spherical joint bearing 5. The fixing part 51 is connected with an inner ring of the spherical joint bearing 5, a positioning hole 511 is formed in the fixing part 51, and the positioning pillar 72 is fitted in the positioning hole 511, thus further ensuring the fitting reliability of the central pillar 71 and the spherical joint bearing 5.

In addition, as illustrated in FIG. 8, the circlip 74 has an arc shape, and the arc-shaped circlip 74 has an opening, so as to be snapped in the latching slot 73 easily. Specifically, a center angle corresponding to the arc is larger than 180 degrees, so as to prevent the circlip 74 from falling off from the latching slot 73. Furthermore, an inner peripheral wall of the circlip 74 is provided with two grooves 741 are spaced apart from each other. The circlip 74 tends to be deformed at the groove 741, such that it is convenient for the circlip 74 to be snapped into the latching slot 73 and taken out of the latching slot 73.

As illustrated in FIG. 2 and FIG. 3, the first mounting plate 11 is provided with a semicircular engaging slot 111, and the spherical joint bearing 5 fitted with the central pillar 71 is configured to be engaged in the engaging slot 111 to fix the spherical joint bearing 5, so as to fix the second driving motor 3.

As illustrated in FIG. 1 and FIG. 2, the driving assembly 100 also includes a front casing 8 connected with the motor bracket 1, and the output shaft of the second driving motor 3 passes through the front casing 8 to be connected with the fan blade 200. The front casing 8 can increase the aesthetics of the appearance of the driving assembly 100 and also prevent dust from falling on the driving assembly 100. The driving assembly 100 also includes a guard lock nut 9 located on a side of the front casing 8 far away from the motor bracket 1. The guard lock nut 9 is threadedly connected with the front casing 8, and the output shaft of the second driving motor 3 passes through the front casing 8 and the guard lock nut 9 to be connected with the fan blade 200. The guard lock nut 9 is used to limit an air output frame of the fan blade 200 between the front casing 8 and the guard lock nut 9 for the purpose of fixing the air output frame. After the first driving motor 2 and the second driving motor 3 are mounted, the front casing 8, the guard lock nut 9 and the fan blade 200 may be then mounted.

The driving assembly 100 has a following operation process. The first driving motor 2 operates, and the output shaft of the first driving motor 2 drives the spherical crank 4 to rotate. The ball head 42 of the spherical crank 4 drives the second end 32 of the second driving motor 3 to rotate 360 degrees around the rotation axis of the connecting pillar 41, such that the output shaft of the second driving motor 3 rotates 360 degrees around the rotation axis of the connecting pillar 41 under the action of the spherical joint bearing 5, so as to further drive the fan blade 200 to rotate 360 degrees around the rotation axis of the connecting pillar 41. An included angle between an outermost edge of a theoretical airflow column formed when the fan blade 200 rotates and a rotation central axis of the fan blade 200 is defined as an air diffusion angle R, and the air diffusion angle R satisfies: 0 degrees<R≤45 degrees. Thus, the air blowing range can be expanded, and the air blowing velocity and the air blowing distance can be enhanced, thus improving the user's need for comfort.

A fan according to an embodiment of the present disclosure will be described below with reference to FIGS. 1-9.

The fan according to the embodiment of the present disclosure includes a support assembly, a driving assembly 100 and a fan head.

Specifically, the motor bracket 1 is rotatably arranged at the support assembly, and the fan head includes a fan blade 200 connected with the output shaft of the second driving motor 3.

In the fan according to the embodiment of the present disclosure, the first driving motor 2 and the spherical crank 4 are provided, one end of the spherical crank 4 is connected with the output shaft of the first driving motor 2, and the ball head 42 is rotatably connected with the second end 32 of the second driving motor 3, such that when the first driving motor 2 operates, the second driving motor 3 and the fan blade 200 connected with the output shaft of the second driving motor 3 can rotate 360 degrees around the rotation axis of the connecting pillar 41, so as to expand the air blowing range, improve the air blowing velocity and the air blowing distance, and hence meet the user's need for comfort.

In some embodiments of the present disclosure, the fan also includes a third driving motor 300 arranged at one of the support assembly and the motor bracket 1, and an output shaft of the third driving motor 300 is connected with the other one of the support assembly and the motor bracket 1. Thus, the fan head can oscillate left and right. The fan head can oscillate left and right, and also rotate 360 degrees around the rotation axis of the connecting pillar 41, so as to expand the air blowing range, improve the air blowing velocity and the air blowing distance, and hence meet user's need for comfort.

In this specification, description with reference to terms "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations may be made in the embodiments without departing from spirit, principles and scope of the present disclosure. The scope of the invention is defined by the claims and their equivalents.

The invention claimed is:

1. A driving assembly comprising:
   a motor bracket;
   a first driving motor arranged on the motor bracket;
   a spherical crank including:
      a connecting pillar, one end of the connecting pillar being connected with an output shaft of the first driving motor; and
      a ball head arranged at another end of the connecting pillar, a sphere center of the ball head being not on a rotation axis of the connecting pillar;
   a second driving motor arranged on the motor bracket and spaced apart from the first driving motor, the second driving motor including an output shaft arranged at a first end of the second driving motor and configured to be connected with a fan blade, and a second end of the second driving motor being rotatably connected with the ball head;
   a spherical joint bearing arranged on the motor bracket;
   a connecting plate connected with the first end of the second driving motor and including a central pillar on a side of the connecting plate facing away from the second driving motor, the central pillar including a latching slot at an outer peripheral wall of the central pillar, and the latching slot extending in a peripheral direction of the central pillar; and
   a circlip configured to be snapped in the latching slot to limit the spherical joint bearing between the connecting plate and the circlip.

2. The driving assembly according to claim 1, further comprising:
   another connecting plate connected with the second end of the second driving motor and including a ball sleeve at a side of the another connecting plate facing away from the second driving motor, the ball sleeve being configured to be fitted with the ball head.

3. The driving assembly according to claim 1, wherein:
   the spherical joint bearing is fitted over the output shaft of the second driving motor.

4. The driving assembly according to claim 3, wherein:
   the central pillar further includes a through hole;
   the output shaft of the second driving motor is configured to be inserted in the through hole; and
   the spherical joint bearing is configured to be fitted over an outer surface of the central pillar.

5. The driving assembly according to claim 4, wherein:
   the spherical joint bearing includes a fixing part connected with an inner ring of the spherical joint bearing, the fixing part including a positioning hole; and
   the connecting plate further includes a positioning pillar fitted in the positioning hole.

6. The driving assembly according to claim 1, wherein:
   the circlip has an arc shape and includes an opening; and
   a portion of the central pillar is fitted in the opening.

7. The driving assembly according to claim 6, wherein a center angle corresponding to the arc shape of the circlip is larger than 180 degrees.

8. The driving assembly according to claim 1, wherein the circlip includes at least one groove at an inner peripheral wall of the circlip.

9. The driving assembly according to claim 1, further comprising:
a rubber sleeve fitted over an outer peripheral wall of the spherical joint bearing.

10. The driving assembly according to claim 1, wherein:
the motor bracket includes an engaging slot; and
the spherical joint bearing is engaged in the engaging slot.

11. The driving assembly according to claim 10, wherein the engaging slot includes an arc slot.

12. The driving assembly according to claim 1, wherein an included angle R between an outermost edge of a theoretical airflow column formed when the fan blade rotates and a rotation central axis of the fan blade satisfies: 0 degrees<R≤45 degrees.

13. A fan comprising:
a driving assembly including:
a motor bracket;
a first driving motor arranged on the motor bracket;
a spherical crank including:
a connecting pillar, one end of the connecting pillar being connected with an output shaft of the first driving motor; and
a ball head arranged at another end of the connecting pillar, a sphere center of the ball head being not on a rotation axis of the connecting pillar;
a second driving motor arranged on the motor bracket and spaced apart from the first driving motor, the second driving motor including an output shaft arranged at a first end of the second driving motor, and a second end of the second driving motor being rotatably connected with the ball head;
a spherical joint bearing arranged on the motor bracket;
a connecting plate connected with the first end of the second driving motor and including a central pillar on a side of the connecting plate facing away from the second driving motor, the central pillar including a latching slot at an outer peripheral wall of the central pillar, and the latching slot extending in a peripheral direction of the central pillar; and
a circlip configured to be snapped in the latching slot to limit the spherical joint bearing between the connecting plate and the circlip; and
a fan head including a fan blade connected with the output shaft of the second driving motor.

14. The fan according to claim 13, further comprising:
a support assembly;
wherein the motor bracket is rotatably arranged on the support assembly.

15. The fan according to claim 14, further comprising:
a third driving motor arranged at one of the support assembly and the motor bracket, an output shaft of the third driving motor being connected with another one of the support assembly and the motor bracket.

16. The fan according to claim 13, wherein an included angle R between an outermost edge of a theoretical airflow column formed when the fan blade rotates and a rotation central axis of the fan blade satisfies: 0 degrees<R≤45 degrees.

* * * * *